Jan. 28, 1969   D. D. CALL   3,424,522
STABILIZED OPTICAL SYSTEM
Filed July 29, 1965   Sheet 1 of 4

Inventor:
Daniel D. Call
By Griffin and Branigan
Attys

Jan. 28, 1969  D. D. CALL  3,424,522

STABILIZED OPTICAL SYSTEM

Filed July 29, 1965  Sheet 4 of 4

Inventor:
Daniel D. Call.

By Griffin and Branigan
Attys

United States Patent Office

3,424,522
Patented Jan. 28, 1969

3,424,522
STABILIZED OPTICAL SYSTEM
Daniel Dale Call, Elk Grove Village, Ill., assignor to Bell & Howell Company, Chicago, Ill., a corporation of Illinois
Filed July 29, 1965, Ser. No. 475,634
U.S. Cl. 352—140                    26 Claims
Int. Cl. G03b 3/10

ABSTRACT OF THE DISCLOSURE

A lens is mounted on a hollow spherical member which also has an adjustable inertia ring mounted thereon for counter balancing the weight of the lens. A rotatable drive means is in frictional contact with the spherical surface so that rotation thereof causes the lens, the inertia ring and the spherical member to rotate therewith. The lens is thereby spin stabilized so that its angular momentum tends to resist motion away from its spin axis, but when the axis of the drive means changes its position relative to the spin axis of the lens the frictional forces between the drive means and the spherical surface cause the sphere, the lens, and the inertia ring—acting as the rotor of a gyroscope—to precess so that the spin axis of the lens realigns itself with the axis of the drive means.

---

This invention relates to stabilized optical systems and more particularly to a mechanism for stabilizing the lenses of cameras, telescopes, field glasses, or other optical instruments against vibratory motions.

Whether optical instruments are hand held or mounted upon a platform which is subjected to vibratory motion, the lenses thereof are generally unavoidably vibrated, thereby resulting in an undesirable image at the focal plane. This is particularly true in the case of a movie camera where vibrations are recorded on successive frames of film which, when magnified during projection, produce a picture which is unpleasant to view and in some instances unintelligible. It is an object of this invention, therefore, to provide a lens stabilization system wherein undesired vibrations are eliminated from the image at the instrument's focal plane, whether they be caused by an operator or a vibrating platform.

It is a more particular object of the invention to provide a movie camera that will produce a stable, non-vibratory picture whether the photographer takes pictures while walking, riding in a car, or even flying in an aircraft in which case the camera is subjected to both severe aircraft vibrations as well as the normal jiggle introduced by the photographer. The invention, however, is not limited to the field of hand held movie cameras. It also has great utility in other fields such as military optical instruments. For example, the Navy has refrained from using high powered binoculars because the users thereof have been unable to hold the binoculars sufficiently stable to focus upon the object which it is desired to view. The Naval forces have even been unable to make full use of the recent developments in the area of telescopic zoom lenses. Again, this is because the users have been unable to focus on the desired object during high zoom lens magnification. This is so even when the binocular or telescope is not hand held, but rather is fastened to a bracket rigidly mounted to the ship, for example.

The invention also has wide use in the field of aerial photography where stabilized moving pictures are rare indeed. Similarly, ground monitored visual guidance systems for missiles have generally proved ineffective because the image received by the ground monitoring station has been too unstable for an operator to accurately detect a target. The system of the invention remedies this situation. In addition, the invention has great utility for use in observational devices currently being used by the Army in tactical and reconnaissance aircraft. For example, the Army has recently experienced difficulties with its helicoper gunners losing sight of a target as soon as the guns are fired. That is, the vibrations from the guns cause related optical sighting systems to jiggle so much that the operator cannot focus on the target. In fact, it is for this reason that many land based anti-aircraft weapons have the sighting systems thereof sufficiently removed from the gun mounting that the gun vibrations do not interfere with the optical sighting mechanisms. By using an optical stabilization system in accordance with the instant invention an operator's ability to visually focus on a desired object is not impeded by platform vibrations. Hence, the sighting mechanism can be located at the gun mount.

It has been previously suggested that a lens be suspended within a fluid contained within a sphere. By spinning the sphere about a given axis, the swirling fluid causes the lens to rotate and, in effect, act as its own gyro whereby it would be stabilized against motion away from its spin axis. Attempts have been made to apply this concept to lens stabilization systems, such as in movie cameras for example. These attempts, however, have brought to light many practical engineering problems which, commensurate with simplicity and economy of manufacture, render the concept impractical. For example, an entire sphere is required; the stabilization of the system is dependent upon viscosity changes with temperature; leakage problems are often encountered; humidity problems lead to odd optical effects upon a resulting image; and in order to prevent wobble of the lens the inner surface of the driving sphere has to be almost perfectly spherical. Accordingly, it is an object of this invention to provide a lens stabilization system that has the attributes of the floating lens structure but does not have its engineering drawbacks.

It is another object of this invention to provide a lens stabilization system that not only compensates for instrument vibrations but is also of the "self-erecting type." That is, the device has a characteristic that the rotor's spin axis will automatically follow and strive steadily to align itself with the axis of its driving member so that the lens always tends to become aligned with the instrument. This erection is accomplished by a precessional torque, the magnitude of which increases as the deviation of the spin axis from the driving axis increases.

In general, the invention employs the floating lens concept wherein a direct friction drive is used to both rotate the lens and cause the lens to erect itself so that its spin axis becomes coaxial with the axis of the drive means.

More particularly, in accordance with the principle of the invention a lens is mounted on a member having a spherical surface. An inertia element is also mounted on the spherically surfaced member to counterbalance the weight of the lens. A friction drive means is in contact with the spherical surface so that rotation of the drive means causes the lens, the inertia element, and the spherically surfaced member to rotate therewith. In this manner, the lens itself acts as its own stabilizing means. That is, once the lens is rotated about a spin axis its angular momentum causes the lens to tend to resist motion away from that spin axis. However, when the axis of the drive means changes its position relative to the spin axis of the lens the frictional forces between the drive means and the spherical surface cause the surface, the lens and the inertia ring—acting as the rotor of a gyroscope—to precess so that the spin axis of the lens realigns itself with the drive axis of the drive means.

By mounting the drive means and the rotatable lens structure within the housing of an optical instrument so that the drive means is rigidly rotatable within the instrument, the lens is effectively a gyro freely suspended within the instrument. Hence, although the instrument may be subjected to external vibrations the lens remains substantially stable in space. On the other hand, if the instrument is relatively slowly rotated such as, for example, when a photographer pans a camera, the lens, acting as part of a gyro rotor, will tend to precess so as to follow this slow motion of the instrument. Consequently, the rotating lens, although not sensitive to undesired vibrations, within practical limits, follows intentional motion of the instrument.

By mounting a mating lens in the housing in front of the rotating lens so as to form a Boscovich type of wedge an image viewed through the wedge remains stable at the focal plane of the wedge irrespective of the motion between the wedge elements. A wedge of this type is more fully described and explained in U.S. Patent No. 2,180,017 entitled, "Camera With Range Finder," and issued to Carl Ort on Nov. 14, 1939. In this manner, the image at the focal plane remains stable even though the housing of the optical instrument is subjected to undesrable vibrations. Moreover, when the instrument is panned relatively slowly the stabilized lens structure by virtue of its precessive ability is adapted to have the image of the thusly panned subject stably appear at the instrument's focal plane.

By providing a second friction element in contact with the spherical surface the precessional forces on the rotor assembly are increased so that the rotor assembly precesses at a more rapid rate, thereby permitting the operator to pan more rapidly and still have the image of the desired object appear on the instrument's focal plane. Additionally, a means may be provided whereby the normal forces between the second friction element and the spherical surface can be adjusted thereby permitting the precession rate of the rotor assembly to be varied.

An advantage of the instant invention is that it is a relatively simple device which is quite easily manufactured, susceptible to large tolerances and therefore, capable of being manufactured at low cost. Additionally, the entire structure is housed in a volume hardly larger than a sphere having a radius equal to the radius of curvature of the rotated lens. For this reason, the structure of the instant invention is admirably suited for use in hand held instruments where compactness is a desirable feature. In this connection it should be noted that by rotating the lens itself the mass of the system is greatly reduced from that which would occur if a separate rotor were used to stabilize a non-rotating lens.

A movie camera is perhaps the most common type of optical device wherein instrument vibration will defeat the purposes for which the instrument is intended. For this reason, although they are suitable for use in a wide variety of instruments, preferred embodiments of the invention will herein be illustrated as being used in combination with a movie camera.

The foregoing and other objects, features, and advantages of this invention will be apparent from the following more particular description of preferred embodiments thereof, as illustrated in the accompanying drawings; wherein the same reference numerals refer to the same parts throughout the various views. The drawings are not necessarily intended to be to scale, but rather are presented so as to illustrate the principles of the invention in clear form.

Figure 1:
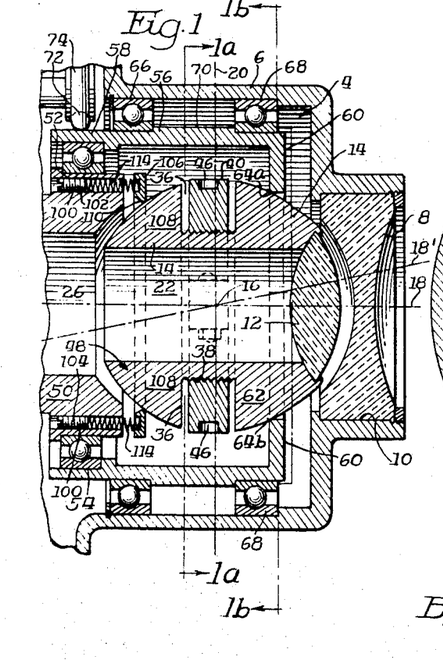
FIG. 1 is a side view of a lens stabilization device embodying the invention.
Figure 2:
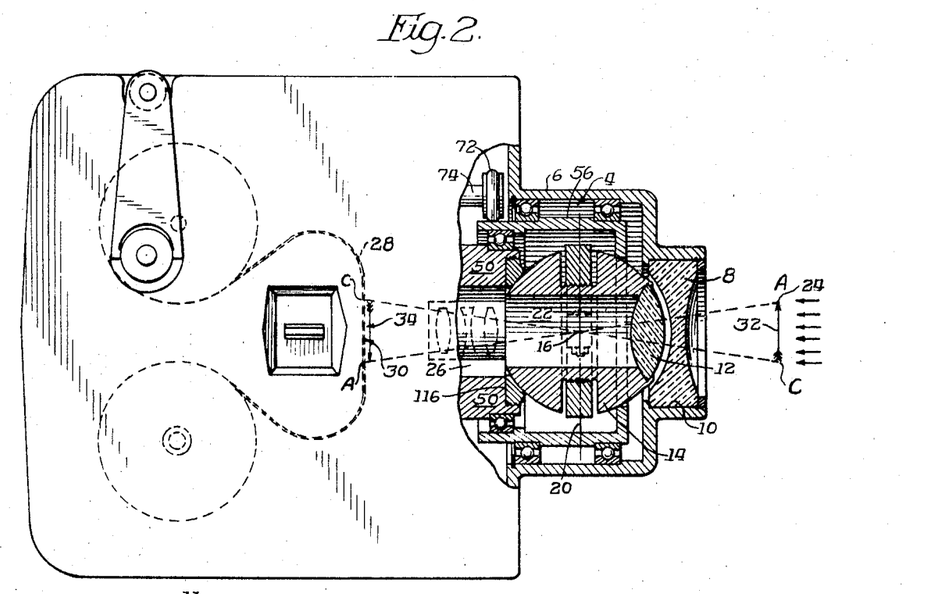
FIG. 2 is a side view of the camera, partially broken away to illustrate the incorporation therein of the embodiment of the invention substantially as illustrated in FIG. 1.

Referring now to FIG. 2; a movie camera 2 has a preferred embodiment of a lens stabilization system 4 mounted in a housing 6 at the forward end of the camera. A lens element 8 is mounted in a groove 10 of the housing as shown in FIG. 1 which illustrates the lens stabilization system 4 as it is broken out of the camera of FIG. 2.

A spherical lens element 12 is located on the right side of a substantially spherically surfaced member 14 in FIG. 1. In the preferred embodiment being described the lens element 12 and the spherically surfaced member 14 have their spherical centers at point 16 which represents the intersection of a horizontal axis 18 and a vertical axis 20. The center of the spherically surfaced member is hollowed out behind the lens 12 to form a hollow cylinder 22 whose axis corresponds to the horizontal axis 18 in FIGS. 1 and 1a. Hence, light entering from the right in FIG. 2, as illustrated by the arrows 24, is permitted to pass through lens elements 8 and 12; through the cylindrical inner portion 22 of the spherically surfaced member 14; through additional ones of the camera's lenses 26 and onto the camera's film 28 located at the focal plane 30 of the entire lens system comprised of camera lenses 26 and the stabilized lens system 4. In this manner an object 32, which it is desired to photograph, has its image 34 focused on the camera's film 28 as shown in FIG. 2. This is more fully illustrated schematically in FIG. 3 and will be referred to in more detail later.

Figure 1A:
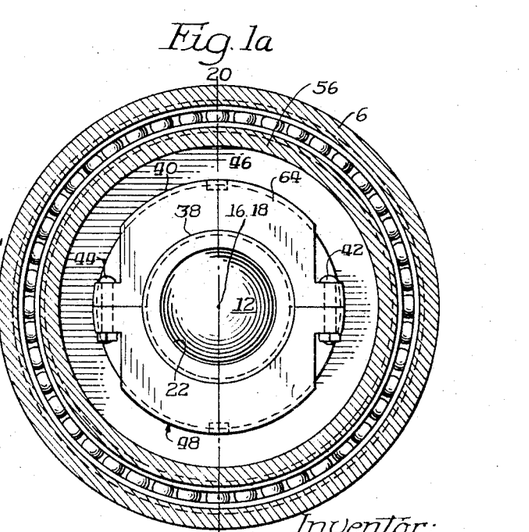
FIG. 1a is a sectional view of the embodiment of the invention illustrated in FIG. 1 taken along the lines A—A thereof.
Figure 1B:
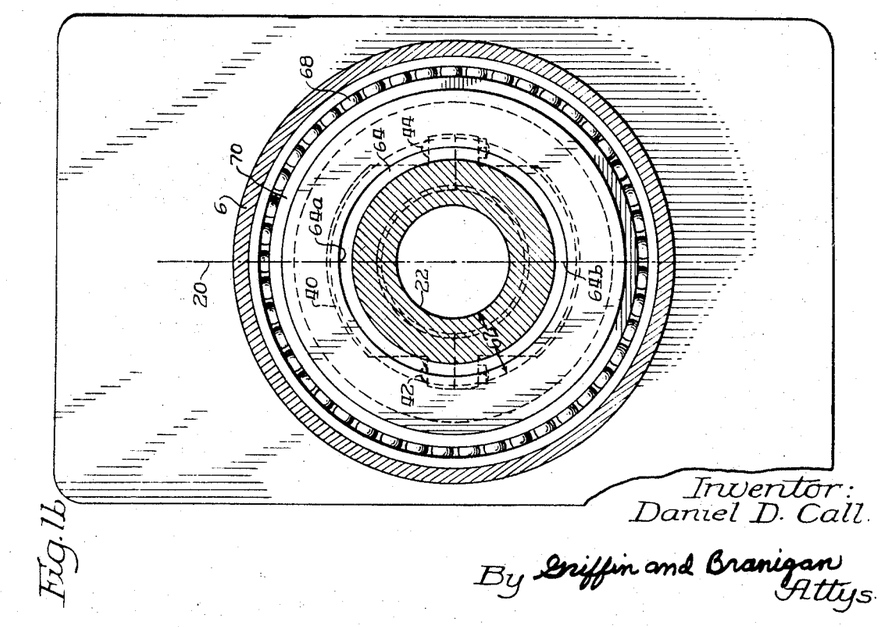
FIG. 1b is a sectional view of the embodiment of the invention illustrated in FIG. 1 taken along the lines B—B thereof.

The sphere 14 (FIG. 1) has a balancing groove 36 running about its entire surface, the balancing groove being symmetrical about a line which is slightly to the left of the vertical axis 20 in FIG. 1. The inner portion of the balancing groove 38 is threaded for engagement with a balancing ring 40. The ring is split during manufacture and fastened in the balancing groove by any suitable means such as pins 42 and 44 as shown in FIGS. 1a and 1b. Prior to fastening, however, the balancing ring is balanced, such as for example by the selected removal of material from a groove 46 running about the circumference thereof. Once mounted in the groove 36 of the spherically surfaced member 14 the balancing ring 40 can be screwed to the left or the right in FIG. 1 to counterbalance the weight of the spherical lens element 12. In this manner the spherically surfaced element, the balancing ring, and the lens 12 comprise a rotor assembly referred to generally as 48 which is statically and dynamically balanced about the point 16.

The camera housing has a drive support member 50 surrounding the inner camera lenses 26 and extending toward the right in FIGS. 1 and 2. Mounted about an outer surface 52 of the drive support member 50 is a bearing assembly 54. A rotor drive member 56 has one end 58 thereof mounted about the outer race of the bearing assembly 54 so that the rotor drive member is rotatable about the horizontal axis 18. The other end 60 of the rotor drive member engages with spherically surfaced portion 62 of the rotor assembly at points 64a and 64b in FIG. 1. The rotor drive member, however, is cylindrical and hence rests upon the spherical drive surface 62 so as to form a circle of contact 64 as is best shown in FIG. 1b.

A second set of bearing assemblies 66 and 68, positioned between the outer cylindrical surface 70 of the rotor drive member and the camera housing 6, permit rotation of the rotor drive member within the housing. A suitable drive means, herein illustrated as a rubber ring 72 on a drive shaft 74 of a drive motor not shown, is used to rotate the rotor drive member 56 about its drive axis 18. Hence, the rotor drive member 56 rotates between bearing assemblies 54 and 66 on the left end in FIG. 1 and between bearing assembly 68 and its circle of contact 64 on the spherical drive surface 62 at its other end.

In operation, the rotor assembly 48 is dragged around the axis 18 by the rotor drive member. This is caused by the frictional forces between the drive means 56 and the spherical surface 62 at their circle of contact 64. Once the rotor assembly is brought up to a sufficient speed it acts as the rotor of a gyroscope and hence is stable in space about the axis 18 which, insofar as the rotor is concerned, is its spin axis. Consequently, after the rotor has obtained its space stability, motion of the camera housing, and thereby the rotor drive member 56, away from the spin axis 18 will cause the circle of contact 64 to move across the spherical drive surface 62 so that the drive axis becomes displaced from the rotor's spin axis. Because this is described in more detail shortly this displacement is merely represented in the FIG. 1 by a displaced axis 18′ representing the displaced drive axis of the rotor drive member.

Figure 3:
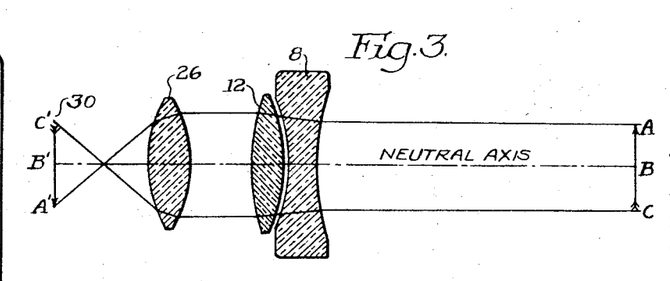
FIG. 3 is a schematic diagram of an image received at the focal plane of a camera as the camera views an object.
Figure 4:
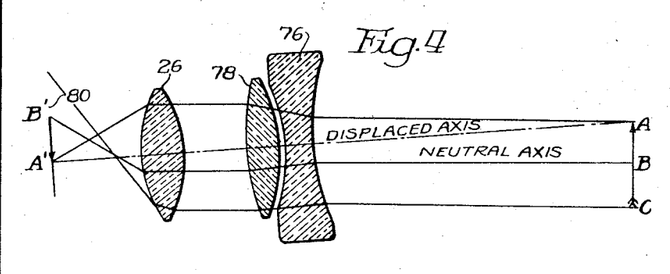
FIG. 4 is a schematic diagram illustrating the image that would be received by an unstabilized lens system when the camera of FIG. 3 is subjected to a vibration.
Figure 5:
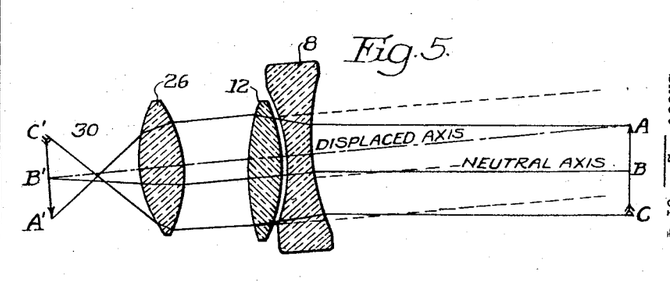
FIG. 5 is a schematic diagram of the image at the focal plane when a camera embodying the invention is subjected to a vibration.

Referring to FIGS. 3, 4, and 5, the optical operation of the above described preferred embodiment of the invention will now be described. Turning first to FIG. 3, the arrow ABC represents an object which it is desired to photograph at a time when the lens stabilization system 4 is in its neutral position and the drive axis of the rotor drive and the spin axis of the rotor are superposed. At this time, light rays coming from the right in FIG. 3 pass through the lens elements 8 and 12, which form a Boscovich type of wedge, and then pass through the non-stabilized lens system 26 to focus an inverted image A′B′C′ of the object ABC at the focal plane 30 of the camera.

FIG. 4 shows corresponding lens elements 76 and 78 of a camera which does not have a stabilized optical system. The camera is shown as having been displaced off of its neutral axis such as, for example, occurs when a photographer holding a movie camera in his hand walks along the ground while photographing. The distance between the displaced axis and the neutral axis in the schematic, therefore, represents the amount of jiggle which is introduced by the photographer. In this case, the object which is desired to be photographed (arrow ABC) has only a portion of its image formed at the focal plane 80 of the camera having the unstabilized lens system. That is, only the AB portion of the object has an image thereof A′B′ formed at the focal plane. The BC portions of the object are not photographed. This illustration corresponds to the often observed shortcoming of home movies wherein the photographer successively cuts off the feet and then the heads of persons whom he is photographing while walking towards them.

FIG. 5 illustrates the operation of a camera employing the stabilized lens system of the instant invention. In this case the photographer has moved the camera off of its neutral axis in the same manner that the camera was moved in connection with FIG. 4. The lens element 12 however, maintains its stability about the neutral axis which in this case is its spin axis. The lens element 8, on the other hand, is displaced along with the camera housing as shown. With respect to the camera housing, therefore, the lens 8 is fixed, while lens 12 is relatively movable although stationary in space. Because the lenses 8 and 12 form a Boscovich type of optical wedge, however, the lens combination is afocal and after passing through the lenses 26 the entire image A′B′C′ of the object ABC is placed upon the focal plane 30 of the camera just as though the camera had not been displaced. Thus, the lens stabilization system of the invention eliminates the photographic effect of undesired vibrations caused by the photographer. Moreover, even if the platform upon which the photographer is located is subjected to random vibrations in addition to those caused by the photographer the image at the focal plane of the camera is further compensated whereby the undesired vibrations do not show up in the final photographs.

It will be appreciated by those skilled in the art that although the invention has been illustrated in connection with a movie camera wherein the vibrations were introduced by a photographer that a similar structure is easily incorporated into binoculars, telescopes, gunsights, or other optical instruments. Moreover, although the invention is particularly well suited for hand held optical instruments wherein weight and compactness are prime requisites the invention is not at all limited thereto. For example, the invention is equally applicable to ground controlled optically guided missile systems.

When a photographer takes pictures with a movie camera he frequently desires to obtain a panoramic view of a particular scene. Hence, he swings the camera through an arc about his body as a axis. This operation is normally referred to as "panning." If the user of a telescope pans too rapidly the fact is immediately apparent to him because his view is not what he would like it to be. Where the viewer intends his efforts to be used in a secondary manner, such as the direction of a gun barrel or the recording of a field of view on film, he is not so immediately aware of his error. In the case of a movie camera, for example, there is no correlation between the ability of the user's eye to adapt to a changing field of view and the ability of the film to record the changing field of view. Indicative of the seriousness of this matter is a recent estimate by a group of trade association members in the camera field that 80% of all home movie film spoilage results from the operator panning too rapidly. It can be appreciated, therefore, that the desire of a photographer to pan is very great. It is for this reason that the stabilized lens system of the instant invention is adapted so that the operator can pan the camera or other optical instrument and still receive the desired stable image at the camera's focal plane. This aspect of the invention will now be described.

The description of the invention thus far, has been directed primarily to low amplitude high frequency vibrations that are normally associated with the undesirable jiggle which is common in moving picture photographs for example. Panning, on the other hand represents an extremely high amplitude, low frequency vibration. So much so, that it is not normally considered a vibration at all and clearly not an undesirable one. In order to permit panning, therefore, the stabilized lens system of the invention is adapted to erect itself so that its spin axis (the neutral axis in FIGS. 3–5) is very slowly brought into alignment with the displaced axis of the drive means. This is accomplished by the gyroscopic action of the above described rotor assembly.

Gyroscopic action is the tendency of a rapidly spinning body to turn about a second axis not parallel to the axis of spin, when acted upon by a torque about a third axis. Generally, the second axis is referred to as the precession axis and the third axis is referred to as the torque axis. Moreover, the rapidly spinning body tends to move in a direction which is perpendicular to the direction of the force which causes the torque. The reason that the spinning body moves perpendicularly to the direction of the force is because the angular momentum of the spinning body and the torque caused by the force acting upon the body resolve themselves in a direction perpendicular to the force. One way to determine the direction in which a spinning body will move when it is subjected to an outside torque is to consider that the body's angular momentum vector moves into alignment with the torque vector about the precession axis orthogonal to both the spin axis and the torque axis.

Figure 6:
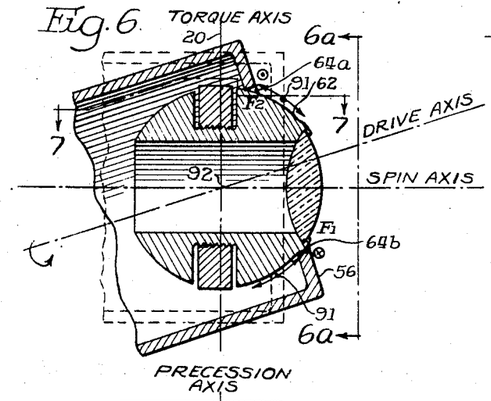
FIG. 6 is a schematic illustration of the fricitonal forces upon the spherical surface of the embodiment of the invention shown in FIG. 1 when it is viewed from the side at a time when the drive axis of the drive means is moved out of alignment with the spin axis of the rotor.
Figure 7:
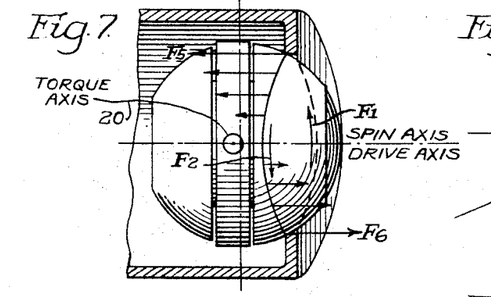
FIG. 7 is a schematic illustration of the frictional forces upon the spherical surface of the embodiment of the invention illustrated in FIG. 1 when it is viewed along the lines 7—7 in FIG. 6 at a time when the drive axis of the drive means is moved out of alignment with the spin axis of the rotor.
Figure 8:
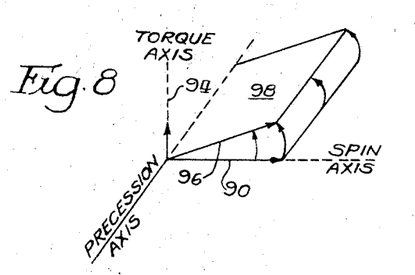
FIG. 8 is a vector diagram illustrating the precessive action of the rotor whereby it erects itself into alignment with the drive axis.

Reference will now be made to FIGS. 6 through 8 in describing the gyroscopic action of the instant invention whereby the rotor assembly 48 is erected by means of the friction forces between the drive means 56 and the spherical surface of the rotor 62. Assume that the rotor drive is rotated in a counterclockwise direction when viewed from the right in FIG. 6. The rotor drive member engages with the spherical surface of the rotor at the circle of contact 64 which includes the points 64a and 64b of FIG. 6. As previously noted, the frictional forces around the circle 64 cause the rotor assembly to spin as a result of the rotation of the rotor drive member. When the rotor drive is in its horizontal or neutral position, shown in phantom in FIG. 6, both the rotor drive member and rotor assembly rotate about the axis labelled spin axis in the figure. The rotor drive member, however, is free to move off of the spin axis, at which time the circle of contact 64 swings across the spherical surface 62. The rotor drive member is shown in a displaced position in FIG. 6. A position such as this would occur, for example, when the photographer attempts to pan an object such as the Washington Monument starting at the bottom and going towards the top.

When the rotor assembly is spinning about its spin axis its angular momentum causes it to maintain stability about the spin axis thereby resisting angular displacement. By the laws of conservation of angular momentum the rotor assembly will maintain its spin axis fixed in space in the absence of any outside forces. By the familiar right hand rule the angular momentum of the spinning rotor can be illustrated by the horizontal vector 90 pointing to the right in FIG. 8 along the spin axis. That is, the vector points in the direction a right hand screw would travel if rotated in the direction of the rotor assembly. Vector 90 is referred to as the spin vector.

Figure 6A:
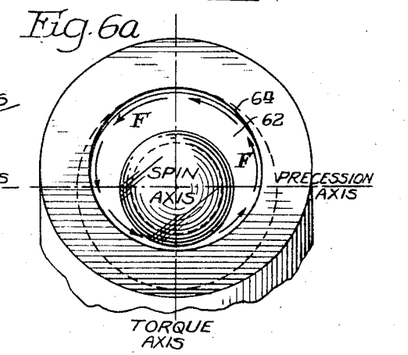
FIG. 6a is a sectional view of FIG. 6's schematic illustration, taken along the lines A—A.

As the rotor is rotated in its counterclockwise direction there is a ring of frictional forces F (FIG. 6a) which occur all along the circle of contact 64. At point 64B this force, designated F1, is into the plane of the paper in FIG. 6 and represented by the conventional cross within a circle. The frictional force F2 which is exerted on the rotor at point 64A, on the other hand, is out of the paper and represented by the similarly conventional dot within a circle. In FIG. 6 the precession axis 92 is in the center of the figure and perpendicular to the plane of the paper. It is this axis about which the rotor will rotate in response to a force applied to the rotor about the torque axis which is the vertical axis 20. When the precession axis 92 is viewed from above, as in FIG. 7, it appears as a vertical line. In FIG. 7, however, the torque axis appears as a point extending into the plane of the paper.

In addition to the tangential forces F1 and F2 which drive the rotor, there are sliding friction forces when the drive axis is inclined as in FIG. 6. These sliding friction forces are at right angles to the circle of contact 64. These forces act along the surface of the gyro sphere 62 and traverse one cycle of arc 91 in FIG. 6, with each revolution of the gyro sphere. In other words, a point of contact on the rotor, for instance 64a, will move along arc 91 and back in one revolution. This movement causes sliding friction forces F5 and F6 which give rise to a torque that permits straight line erection or precession of the gyro back to center along the path whence the camera has been displaced. The friction forces along arc 91 are zero (changing direction) at the extremities of arc 91 and maximum (F5 and F6) at the points of miximum velocity which are at the center of arc 91. These maximum forces, F5 and F6, can best be seen in FIG. 7 which is a top view of FIG. 6 and give rise to a torque vector out the plane of the paper in FIG. 7 along torque axis 20. This torque vector is represented schematically by the arrow 94 in FIG. 8. It is this friction torque that acts as the outside force to move the rotor off of its spin axis. This is easily shown in FIG. 8 by resolving the two vectors 90 and 94 into vector 96. Hence, the direction of precession of the rotor in FIGS. 6 and 8 is in a counterclockwise direction, as illustrated by the schematic wedge shaped element 98 of FIG. 8.

It can be seen, therefore, that when the drive axis of the rotor drive member is moved off of the rotor's spin axis the frictional forces upon spherical surface 62 cause the rotor to precess until it has erected itself. When the rotor is erected so that the spin axis is in alignment with the drive axis there is no longer any movement along arc 91 and therefore no frictional forces F5 and F6. Consequently, there is no resulting torque about the torque axis and precession ceases. It should be appreciated, however, that this friction erection is a relatively slow process as compared with the frequency of the undesired vibrations which have been previously discussed. Consequently, although the lens system of the invention follows the relatively slow panning motion by the photographer, any undesired vibrations occurring during this panning are effectively filtered out, whereby only the desired motion is recorded on the film.

Returning now to FIG. 1, another aspect of the invention will be discussed wherein the angular velocity of the lens system's friction erection can be varied. The drive support member 50 has a plurality of tapped channels 100 located about the circumference thereof. Only two of these channels are shown in the figure. Screws 102 and 104 are threaded into the two channels 100 as shown in the figure. A ring member 106 extends about the rear portion 108 of the spherically surfaced member 14 so that it too has a ring of contact 110 in engagement with the spherical surface 108. Springs 114 are located in each of the tapped channels and extend from the surfaces of screws 102 and 104 in FIG. 1 to the ring member 106 urging it into engagement with the rear spherical surface 108 of the rotor assembly.

By adjusting the screws 102 and 104 (as well as other similar screws not shown) the frictional forces between the ring member 106 and the rear spherical surface 108 are varied. At the same time that the ring member 106 is urged to the right in FIG. 1 the frictional forces between the rotor drive means 56 and forward spherical surface 62 increase. Hence, when the instrument is panned so that the drive axis 18' becomes displaced from the spin axis 18 the frictional forces causing erection are greater and erection occurs at a faster rate. Consequently, if it is desired to pan the instrument more rapidly it is merely necessary to tighten down on the screws 102 and 104, whereby the stabilized lens 12 will more rapidly follow the motion of the lens element 8.

The panning rate adjustment feature of the instant invention has been described in connection with the friction ring 106. It will be appreciated, however, that other types of friction adjustment devices can also be used. In FIG. 2, for example, a circular spring element 116 is shown as being threadably mounted in the camera housing's drive support member 50. Hence, by rotating the spring member 116 the friction on the spherical surfaces can be altered and the erection rate changed accordingly.

It is similarly contemplated that other types of spring devices could be used such as, for example, a Belleville spring or perhaps merely spring contact fingers arranged arcuately about the rear spherical surface.

The invention is described in terms of a drive means having substantially circular contact with the spherical surface of the rotor. It will be appreciated, however, that wide contact over a greater portion of the spherical surface is within the scope of the invention. For example, so long as the contact is not so great that the drive means can not move over the rotor's spherical surface, the contact portion may be spherical.

Figure 9:
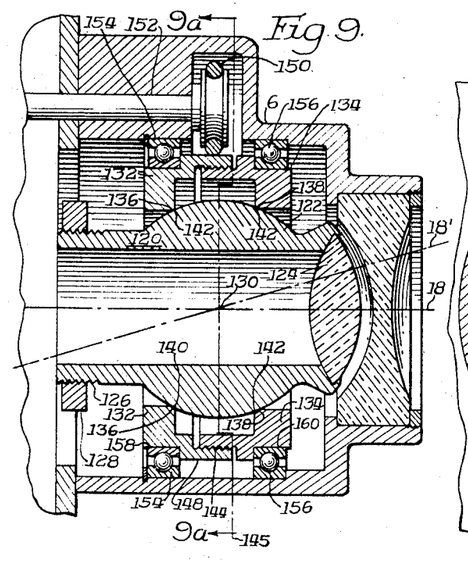
FIG. 9 is a side view of an alternative embodiment of the invention illustrated in FIG. 1.

In FIG. 9 there is illustrated another embodiment of the invention wherein the rotor assembly is driven by mutually adjustable friction rings. The rotor assembly is comprised of an elongated element 120 having a central spherical surface 122. A lens element 124 is mounted in the right hand portion of the spherically surfaced element in FIG. 9. The rear portion of the elongated element 120 is threaded at 126, as shown, to receive a correspondingly threaded counterbalancing ring 128. The ring 128 is rotatable back and forth to counterbalance the weight of the lens 124 about a common center of curvature 130 of the spherical surface 122 and the lens 124.

Two rotor drive members 132 and 134 surround the spherical surface 122 so that friction surfaces 136 and 138 respectively are in contact with circular portions 140 and 142, respectively of the spherical surface. The two rotor drive members 132 and 134 are threadably engaged at 144 to form a cylindrical member which substantially symmetrically surrounds the spherical surface of the rotor. The outer surface 148 of the rotor drive member 132 is in engagement with a rubber drive ring 150 mounted on a drive shaft 152 which is driven by a means not shown. The entire rotor assembly and the cylindrical rotor drive assembly are mounted in the camera housing 6 by means of two rings of bearings 154 and 156, the inner races of which are in contact with recessed portion 158 and 160 of the rotor drive members 132 and 134 respectively.

Figure 9A:
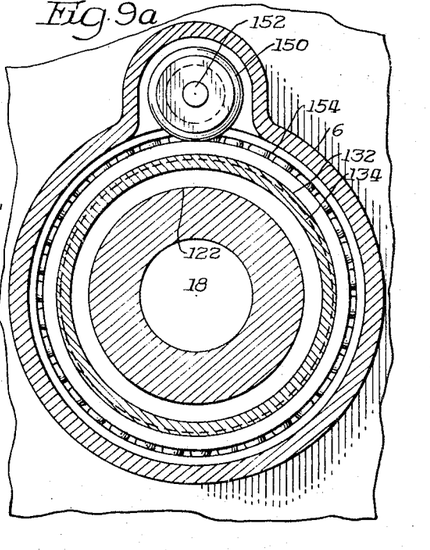
FIG. 9a is a sectional view of FIG. 9 taken along the lines A—A thereof.

The operation of the embodiment of the invention shown in FIGS. 9 and 9a is similar to the device described in connection with FIG. 1. The rubber drive ring 150 drives the rotor drive members about drive axis 18 and the frcitional forces between circles of contacts 140 and 142 drag the rotor assembly around the same axis. Once the rotor assembly is up to speed, however, it tends to remain stable about its spin axis 18. Motion of the camera housing away from the spin axis 18 towards displacement axis 18', if relatively rapid such as occurs during undesired vibrations, causes the photographed image to appear at the focal plane of the camera just as though the camera housing had never been moved. Because this action occurs in the same fashion as was described in connection with FIGS. 3–5 it will not be further described at this time.

If the photographer pans the camera at a relatively slow rate the frictional forces on the spherical surface 122 cause a torque about the vertical axis 145 passing through the point 130 in FIG. 9. This torque causes the rotor to move about its precessional axis (through point 130 and perpendicular to the plane of the paper) so that the spin axis 18 lines up with the displacement axis 18'. This operation is substantially the same as that described in connection with FIGS. 6, 7, and 8 and hence will not be further described either.

In order to change the precession rate of the rotor in FIG. 9 it is merely necessary to rotate the rotor drive elements 132 and 134 relative to each other thereby changing the frictional forces at the contact rings 140 and 142. It will be appreciated by those skilled in the art, however, that although threaded engagement is shown between the two rotor drive members 132 and 134 that a sliding frictional engagement or a spring engagement could be used as well without departing from the invention.

Still another alternative embodiment of the invention will now be described in connection with FIG. 10. The previously discussed embodiments of the invention are driven by a drive means that is external to the spherical portion of the surface of the rotor. The instant embodiment, on the other hand, has the drive means thereof located substantially within the rotor whereby the lens stabilization system may be made more compact. Hence, the embodiment of the invention about to be described is particularly suited for hand held optical instruments where compactness takes on greater importance.

Figure 10:
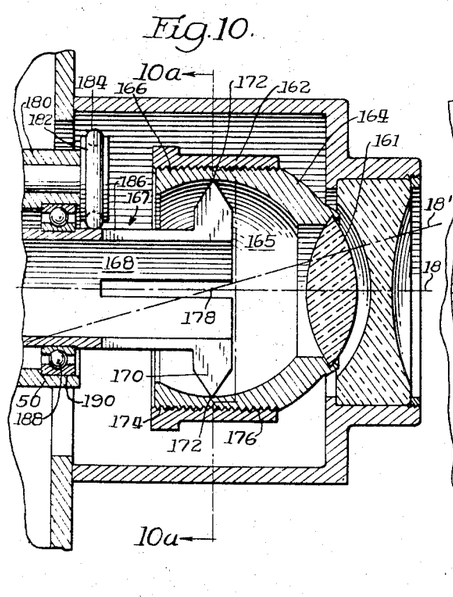
FIG. 10 is a side view of yet another alternative embodiment of the invention depicted in FIG. 1.

In FIG. 10 the rotor assembly includes a lens 161 and an inertia ring 162 similar to the lens and counterbalancing elements described in connection with previous embodiments. These elements are coupled together by a member 164 having a spherical surface 165 on the inner portion thereof as shown. The coupling element, corresponding to the spherically surfaced elements of the previous embodiments, has the rear portion 166 thereof substantially cut away and adapted to receive a rotor drive assembly 167. The rotor drive assembly is comprised of a substantially cylindrical shell member 168 which has a circular driving knife 170 mounted on one end thereof. The driving knife has a knife edge 172 which is in continuous circular contact with the inner spherical surface 165 of the coupling element 164. The outer surface of the spherically surfaced coupling element is threaded at 174 for engagement with correspondingly threaded inner portion 176 of the inertia ring 162. The rotor assembly is counterbalanced about point 178, which is the common center of curvature for the lens element 160 and the spherically surfaced coupling element 164, by rotating the inertia ring 162 with respect to the spherically surfaced coupling element 164. The plane of the driving element's knife edge 172 contains the center point 178 about which the rotor is balanced. In this manner the rotor assembly is also balanced about the knife edge.

A drive shaft 180, driven by means not shown, has a drive wheel 182 mounted on one end thereof. A rubber driving ring 184 is fastened about the circumference of the drive wheel 182 and engages with the outer surface 186 of the cylindrical shell member 168. The left end of the cylindrical shell member 168 has pressed therein a bearing assembly 188 the outer surface 190 of which is mounted within the drive support member 50 of the camera housing.

From the above description of the structural arrangement of the embodiment of the invention it can be seen that light rays entering through the lenses at the right of FIG. 10 pass through the lens stabilization system after which they pass through the camera's interior lenses and are focused on the focal plane of the camera, not shown in this figure. In this respect this embodiment of the invention is similar to that described in connection with FIG. 2.

In operation, rotation of the drive shaft 180 is transmitted to the driving knife edge 172 by means of the rubber driving ring 184. As the knife edge rotates the frictional forces (F1–F4 in FIG. 10a) between it and the inner spherical surface 165 of the coupling element 164 cause the rotor assembly to rotate along with the knife edge. Once the rotor assembly is brought up to speed it is stable about the spin axis 18 in a manner similar to that described in connection with the other embodiments of the invention. Similarly, the image of the photographed object is stably maintained on the film at the camera's focal plane as has been described in connection with FIG. 5. Because this portion of this embodiment's operation has been previously described it will not be further discussed herein. The means by which the lens is erected into alignment with the drive axis of the camera during panning is somewhat different than that described in connection with the prior embodiments. Consequently, this embodiment's friction now will be discussed.

When the camera is panned in a vertical plane the camera housing and the rotor drive assembly are displaced from the axis of the rotor. This displacement is indicated by the displacement axis 18' in FIG. 10 and corresponds to the axis labelled drive axis in FIG. 11 which is a schematic representation of the embodiment of the invention illustrated in FIGS. 10 and 10a.

Figure 11:
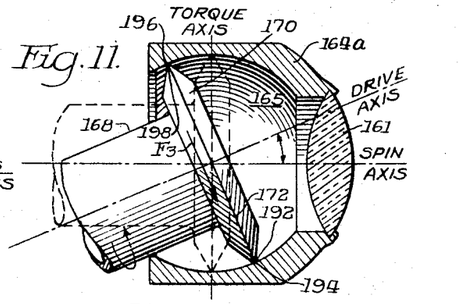
FIG. 11 is a schematic illustration of the device shown in FIG. 10 and is used to illustrate the frictional forces upon the rotor assembly at a time when the drive axis of the drive means is moved out of alignment with the spin axis of the rotor assembly.

In FIG. 11, the drive wheel 170 is mounted on the end of shaft 168 and is rotated in a counterclockwise direction when viewed from the right. Shaft 168 has not been shown to scale in this figure, but is shown as being solid and smaller than in FIG. 10. This is in order to exaggerate the relative motion between the spin axis and drive axis in the schematic. In correspondence with FIG. 10, the knife edge 172 is shown as being in circular contact with a spherical inner surface 165 of an element designated 164a which corresponds to rotor 164 of FIG. 10. Frictional forces (F1–F4) between the knife edge and the spherical surface cause the rotor to spin as a result of the shaft rotation. When the shaft 191 is in its horizontal or neutral position, shown in phantom in FIG. 11, both the shaft and the rotor rotate about the axis labeled spin axis in the figure. The shaft, however, is free to move off of the spin axis, at which time the knife edge swings across the spherical surface 165. The shaft 168 is shown in a displaced position in FIG. 11, the axis thereof being labelled drive axis.

Once the rotor has started spinning about the spin axis its angular momentum causes it to maintain stability about the spin axis and resist angular displacement therefrom. This phenomenon is dictated by the laws of conservation of angular momentum. By the right hand rule the angular momentum of the spinning rotor can be illustrated by the horizontal vector 193 pointing to the right in the FIG. 13 along the spin axis. That is, the vector points in a direction a right hand screw would travel if rotated in the direction of the rotor. Vector 193 is referred to as the spin vector.

Figure 10A:
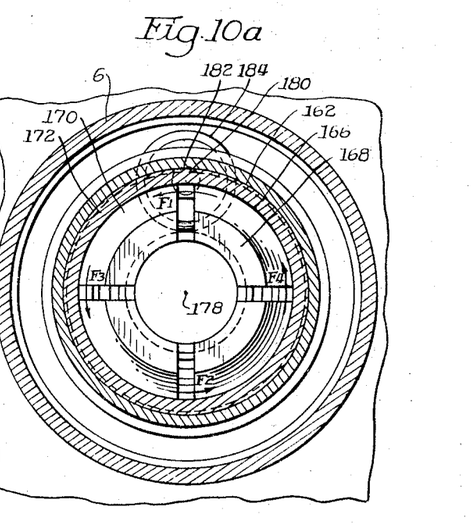
FIG. 10a is a sectional view of the embodiment of the invention shown in FIG. 10 taken along the lines A—A thereof.

Because the knife edge 172 is in substantially circular contact with the rotor's spherical surface 165, rotation of the drive shaft gives rise to an opposing circle of frictional forces upon the rotor as was illustrated in connection with FIG. 10a. As the wheel 170 is rotated in its counter-clockwise direction the friction force of knife edge point 192 is into the paper at point 194 on the rotor in FIG. 11, and the frictional force on the rotor at point 196 caused by motion of pont 198 on the knife edge, is out of the paper. These frictional forces on rotor points 194 and 196 are labelled F1 and F2 respectively and correspond to the similarly labelled forces in FIGS. 10a and 12. Similar frictinoal forces are placed upon the rotor at all points along its circle of contact with the knife edge.

Figures 11A, 11B, 12:
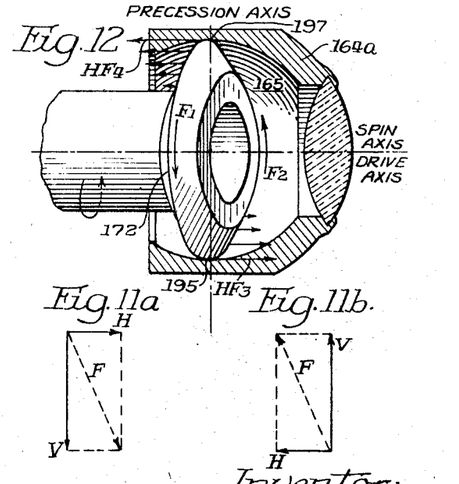
FIG. 11a is a vector diagram of frictional forces in FIGS. 11 and 12.
FIG. 11b is another vector diagram of frictional forces in FIGS. 11 and 12.
FIG. 12 is a schematic illustration of the frictional forces on the device of FIG. 11 when it is viewed from above; and, FIG. 13 is a vector diagram of the angular momentum and erecting torque of the rotor assembly which resolve themselves so as to cause precession of the rotor.

For example, the frictional forces at points 195 and 197 are represented by the arrows labelled F3 and F4, respectively in FIGS. 11 and 12. Each of these frictional forces can be resolved into a horizontal and vertical component. This is illustrated in FIGS. 11a and 11b wherein vector V represents the respective vertical components of the friction forces F3 and F4. Similarly, the vector H represents the respective horizontal components of the friction forces F3 and F4.

In FIG. 11 the precession axis is in the center of the figure and perpendicular to the plane of the paper. This axis is similarly shown in perspective in FIG. 13, and in FIG. 12 it appears as a vertical line. It is this axis about which the rotor will rotate in response to a force applied about the torque axis which appears as a vertical line in FIGS. 11 and 13, but appears as a point extending into the plane of the paper in FIG. 12. The friction forces in FIG. 12 represent only the horizontal components of the frictional forces place upon the rotor by the knife edge. This is because only the horizontal components of the frictional forces give rise to a torque about the torque axis—the axis about which torque is required in order for the rotor's spin axis to precess about the precession axis and into alignment with the drive axis. The horizontal components of the friction forces F3 and F4 are designated as HF3 and HF4 in FIG. 12 and are derived from the same sliding phenomenon that was explained for F5 and F6 of FIG. 7. These components are equal to the total frictional force at the particular point on the rotor times the sine of $\alpha$, where $\alpha$ is the angle between the knife edge and the torque axis which is equal to the angle between the drive axis and the spin axis. The moment arm of the friction forces F3 and F4 about the torque axis is equal to the radius R of the drive wheel. Hence, the torque about the torque axis due to the friction forces F3 and F4 is equal to FR sine $\alpha$, where F is the particular friction force. A similar analysis can be performed for the friction forces at each point on the circle of contact.

Figure 13:
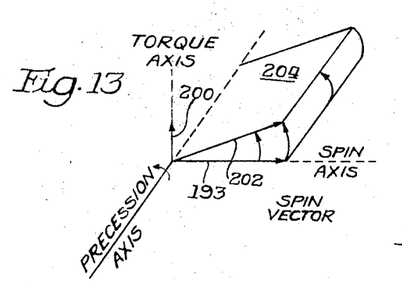

In FIG. 13 the torque vector 200 represents the vector sum of all of the torques caused by the friction forces of the knife edge upon the rotor's spherical surface and also represents the outside influence for moving the rotor's spin axis into alignment with the drive axis. This is easily shown in FIG. 13 by resolving the two vectors 193 and 200 into vector 202. Hence, the direction of precession of the rotor in FIGS. 11 and 13 is in a counter-clockwise direction about the precession axis illustrated by the schematic wedge shaped element 204 of FIG. 13.

As noted above the friction torques about the torque axis are dependent upon the sine of the angle between the drive axis and the spin axis. As the rotor precesses about its precession axis the sine of that angle gradually decreases whereby the erection torque decreases. Consequently, because a gyro's erection rate is proportional to the torque giving rise to that erection, the rotor's percession rate will gradually slow down as the spin axis of the rotor begins to line up with the drive axis of the shaft 168. It can be seen, therefore, that when the drive axis of the drive wheel is moved off of the rotor's spin axis the frictional forces of the knife edge upon the spherical internal surface of the rotor cause the rotor to precess until it has erected itself.

For ease of illustration the action of the various embodiments has been described in connection with panning and vibration in a vertical plane. However, it will be understood that each of the embodiments disclosed herein works equally well when the motion resulting from either panning or vibration has only a horizontal component or has both a vertical and a horizontal component. Also, it will be apparent to those skilled in the art that although the above described embodiments of the invention have been described in connection with a movie camera that the invention is readily adaptable to other optical instruments. For example, a lens stabilization system such as is provided by the instant invention, when coupled to the objective lens of a zoom binocular, will permit this desirable type of binocular to be used even on the high seas while a ship is pitching and rolling and subjected to severe engine vibrations.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. In a lens stabilization system, the combination comprising:
   a rotor having a spin axis and comprised of a lens and a spherically surfaced member;
   a rotatable drive means for frictionally contacting only a portion of said spherical surface;
   and means to rotate said drive means, said frictional contact between said drive means and said spherical surface causing said rotor to spin about said spin axis whereby said rotor and thereby said lens are spin stabilized.

2. The apparatus of claim 1 wherein said contact between said rotatable drive means and said spherical surface is substantially circular.

3. The apparatus of claim 1 wherein said spherical surface and said lens have the same center of curvature.

4. The apparatus of claim 1 wherein said rotatable drive means substantially surrounds said spherical surface at said portion of contact.

5. The apparatus of claim 4 wherein said contact between said rotatable drive means and said spherical surface is substantially circular.

6. The apparatus of claim 4 including a biasing means for urging said rotatable drive means into said contact with said spherical surface.

7. The apparatus of claim 6 wherein said biasing means is a spring.

8. The apparatus of claim 7 including means adapted to adjust the spring force of said spring whereby the frictional forces between said drive means and said rotor are adjustable.

9. The apparatus of claim 1 wherein said spherical surface substantially surounds said drive means.

10. The apparatus of claim 9 wherein the contact between said drive member and said spherical surface is substantially circular.

11. In an optical instrument the combination comprising:
    a housing;
    a first lens mounted in said housing;
    a rotor having a spin axis and comprised of a second lens and a spherically surfaced element;
    said rotor being located within said housing so that said first and second lenses form an optical wedge;
    a rotatable drive means having frictional contact with only a portion of said spherical surface;
    and means to rotate said drive means, said frictional contact between said drive means and said spherical surface causing said rotor to spin about said spin axis whereby said rotor and thereby said second lens are spin stabilized.

12. The apparatus of claim 11 wherein the frictional contact between said drive means and said spherical surface is substantially circular.

13. The apparatus of claim 11 wherein said spherically surfaced element and said second lens have the same center of curvature.

14. The apparatus of claim 11 wherein said rotatable drive means substantially surrounds said spherical surface at said portion of contact.

15. The apparatus of claim 11 wherein said spherical surface substantially surrounds said rotatable drive means.

16. In a moving picture camera which is adapted to focus light rays from an object onto a film station, the combination comprising:
    a camera housing which includes an object portion and an image portion;
    a first lens mounted in said object portion of said housing, said film station being at said image portion of said housing;
    a rotor adapted to spin about a spin axis and comprised of a spherically surfaced member and a second lens mounted coaxially with said spin axis, said rotor being located within said housing so that said first and second lenses form an optical wedge whereby an image form an object is focused at said film station irrespective of relative motion between said lenses;
    rotatable drive means mounted within said housing for rotation about a drive axis and being in frictional engagement with only a portion of said spherical surface, so that said drive axis and said spin axis are movable relative to each other;
    and means to rotate said drive means so that the friction between said drive means and said spherical surface causes said rotor to spin about said spin axis, said rotor thereby being relatively stable in space about said spin axis, but adapted to precess into coaxial superposition with said drive axis when said drive axis is divergent from said spin axis.

17. The apparatus of claim 16 wherein said contact between said rotatable drive means and said spherical surface is substantially circular.

18. The apparatus of claim 16 wherein said spherically surface member and said second lens have the same center of curvature.

19. The apparatus of claim 16 wherein said rotatable drive means substantially surrounds said sperical surface at said portion of contact.

20. The apparatus of claim 16 wherein said spherical surface substantially surrounds said rotatable drive means.

21. In a lens stabilization system, the combination comprising:
    a rotor having a spin axis and comprised of a lens and a member having first and second spherical surface thereon;
    a rotatable drive means for frictionally contacting a portion of said first spherical surface, said drive means substantially surrounding the portion of contact on said first spherical surface;
    means to rotate said drive means, said frictional contact between said drive means and said first spherical surface causing said rotor to spin about said spin axis whereby said rotor and thereby said lens are spin stabilized;
    and means contacting said second spherical surface for urging said first spherical surface into contact with said drive means.

22. The apparatus of claim 21 wherein said urging means includes a spring means.

23. The apparatus of claim 22 including a means for adjusting the spring force of said spring urging means whereby the frictional forces between said drive means and said first spherical surface are adjustable.

24. In a lens stabilization system, the combination comprising:
    a rotor having a spin axis and comprised of a lens and a spherically surfaced member having first and second spherical portions thereof, said lens and said spherically surfaced portions having a common center of curvature, said lens and said first portion of said spherical surface being on one side of said center of curvature and said second portion of said spherical surface being on another side of said center of curvature;
    a rotatable drive means having first and second drive members in frictional contact with said first and second portions of said spherically surfaced member respectively;

and means to rotate said drive means, said frictional contact between said drive members and said spherical surfaces causing said rotor to spin about said spin axis whereby said rotor and thereby said lens are spin stabilized.

25. The apparatus of claim 24 including an inertia ring mounted on said motor to balance the weight of said lens about said center of curvature;

and means to adjust the position of said inertia ring along the axis of said rotor.

26. The apparatus of claim 24 wherein said drive members are mutually adjustable along the aixs of said rotor so that said friction forces between said first and second drive means and said first and second portions of said spherically surfaced member are respectively adjustable.

References Cited

UNITED STATES PATENTS

| | | | |
|---|---|---|---|
| 1,586,070 | 5/1926 | Cooke | 95—12.5 |
| 2,709,922 | 6/1955 | Knutson | 74—5.6 |
| 2,769,367 | 11/1956 | Schwesinger | 352—116 |
| 2,817,995 | 12/1957 | Kirkham | 352—117 |
| 2,951,377 | 9/1960 | Lahde. | |
| 3,035,477 | 5/1962 | Ten Bosch et al. | 88—1 |
| 3,302,543 | 2/1967 | Ross | 95—16 |

JULIA E. COINER, *Primary Examiner.*

U.S. Cl. X.R.

95—12.5; 350—16; 352—244